US012743038B2

(12) United States Patent
Maejima

(10) Patent No.: US 12,743,038 B2
(45) Date of Patent: Sep. 22, 2026

(54) IMAGE FORMING APPARATUS THAT CHARGES AN IMAGE BEARING MEMBER USING A VOLTAGE SET ACCORDING TO AN ENVIRONMENTAL TEMPERATURE

(71) Applicant: CANON KABUSHIKI KAISHA, Tokyo (JP)

(72) Inventor: Masato Maejima, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/822,898

(22) Filed: Sep. 3, 2024

(65) Prior Publication Data

US 2025/0102947 A1 Mar. 27, 2025

(30) Foreign Application Priority Data

Sep. 27, 2023 (JP) ................................ 2023-166022

(51) Int. Cl.
*G03G 15/02* (2006.01)
*G03G 15/00* (2006.01)

(52) U.S. Cl.
CPC ..... *G03G 15/0266* (2013.01); *G03G 15/0208* (2013.01); *G03G 15/5004* (2013.01); *G03G 15/5045* (2013.01)

(58) Field of Classification Search
CPC ...................... G03G 15/0266; G03G 15/5045
See application file for complete search history.

(56) References Cited

U.S. PATENT DOCUMENTS

| | | | | |
|---|---|---|---|---|
| 9,002,224 B2 * | 4/2015 | Motomura | G03G 15/1645 399/50 |
| 2011/0158664 A1 | 6/2011 | Hotomi et al. | |
| 2013/0177328 A1 * | 7/2013 | Fukuda | G03G 15/0266 399/50 |
| 2013/0259502 A1 * | 10/2013 | Motomura | G03G 15/0266 399/50 |
| 2019/0146369 A1 * | 5/2019 | Mandai | G03G 15/5033 399/50 |

FOREIGN PATENT DOCUMENTS

| | | | | |
|---|---|---|---|---|
| CN | 101501578 B * | 9/2011 | G03G 15/0266 |
| JP | 2001201921 A | 7/2001 | |
| JP | 2016114727 A | 6/2016 | |
| JP | 2018084756 A | 5/2018 | |

OTHER PUBLICATIONS

CN_101501578 Original and translation (Year: 2011).*

* cited by examiner

*Primary Examiner* — Arlene Heredia Ocasio
(74) *Attorney, Agent, or Firm* — ROSSI, KIMMS & McDOWELL LLP

(57) ABSTRACT

Third control of controlling a voltage application portion to apply, to a charging member, a voltage obtained by offsetting a first correction value with respect to a value of a voltage previously applied to the charging member is performed in a case where an absolute value of a difference is lower than a predetermined threshold and first control is previously performed, and fourth control of controlling the voltage application portion to apply, to the charging member, a voltage obtained by offsetting a second correction value with respect to a value of a voltage previously applied to the charging member is performed in a case where the absolute value of the difference is lower than the predetermined threshold and second control is previously performed.

6 Claims, 10 Drawing Sheets

FIG 4

| AMBIENT TEMPERATURE T1[℃] | ALTERNATING-CURRENT VOLTAGE Vx[V] |
|---|---|
| 5 | 2900 |
| 6 | 2700 |
| 7 | 2600 |
| 8 | 2450 |
| 9 | 2300 |
| 10 | 2200 |
| 11 | 2100 |
| 12 | 2060 |
| 13 | 2020 |
| 14 | 1980 |
| 15 | 1940 |

*FIG 7*

| AMBIENT TEMPERATURE T1[°C] | ΔT(=T1−T2) | | | | | | |
|---|---|---|---|---|---|---|---|
| | −3°C | −2°C | −1°C | −0°C | 1°C | 2°C | 3°C |
| 12 | 216 | | | | | | |
| 13 | 162 | 72 | | | | | |
| 14 | 108 | 72 | 36 | | | | |
| 15 | 108 | 72 | 36 | 0 | | | |
| 16 | 108 | 72 | 36 | 0 | −36 | | |
| 17 | 108 | 72 | 36 | 0 | −36 | −72 | |
| 18 | 108 | 72 | 36 | 0 | −36 | −54 | −72 |
| 19 | 108 | 72 | 36 | 0 | −18 | −36 | −54 |
| 20 | 90 | 54 | 18 | 0 | −18 | −36 | −54 |
| 21 | 72 | 36 | 18 | 0 | −18 | −36 | −54 |
| 22 | 54 | 36 | 18 | 0 | −18 | −36 | −54 |
| 23 | 54 | 36 | 18 | 0 | −18 | −36 | −54 |
| 24 | 54 | 36 | 18 | 0 | −18 | −36 | −54 |
| 25 | 54 | 36 | 18 | 0 | −18 | −36 | −54 |
| 26 | 54 | 36 | 18 | 0 | −18 | −36 | −54 |
| 27 | 54 | 36 | 18 | 0 | −18 | −36 | −54 |
| 28 | 54 | 36 | 18 | 0 | −18 | −36 | −40 |
| 29 | 54 | 36 | 18 | 0 | −18 | −22 | −26 |
| 30 | 54 | 36 | 18 | 0 | −4 | −8 | −12 |

FIG 8

| AMBIENT TEMPERATURE T1[°C] | ΔT(=T1−T2) | | | | | | |
|---|---|---|---|---|---|---|---|
| | −3°C | −2°C | −1°C | −0°C | 1°C | 2°C | 3°C |
| 5 | 600 | 400 | 200 | 0 | −200 | −300 | −450 |
| 6 | 600 | 400 | 200 | 0 | −100 | −250 | −400 |
| 7 | 500 | 300 | 100 | 0 | −150 | −300 | −400 |
| 8 | 450 | 250 | 150 | 0 | −150 | −250 | −350 |
| 9 | 400 | 300 | 150 | 0 | −100 | −200 | −240 |
| 10 | 400 | 250 | 100 | 0 | −100 | −140 | −180 |
| 11 | 350 | 200 | 100 | 0 | −40 | −80 | −120 |
| 12 | 240 | 140 | 40 | 0 | −40 | −80 | −120 |
| 13 | | 80 | 40 | 0 | −40 | −80 | −120 |
| 14 | | | 40 | 0 | −40 | −80 | −120 |
| 15 | | | | 0 | −40 | −80 | −120 |
| 16 | | | | | −40 | −80 | −120 |
| 17 | | | | | | −80 | −100 |
| 18 | | | | | | | −80 |

FIG 9

| PRINT JOB | | JOB1 | JOB2 | JOB3 | JOB4 | JOB5 | JOB6 | JOB7 | JOB8 | JOB9 |
|---|---|---|---|---|---|---|---|---|---|---|
| AMBIENT TEMPERATURE | | 14°C | 16°C | 14°C | 16°C | 14°C | 16°C | 14°C | 16°C | 17°C |
| ALTERNATING-CURRENT VOLTAGE DETERMINATION PROCESSING | DISCHARGE CURRENT CONTROL | – | – | – | – | – | – | – | – | |
| | CONSTANT VOLTAGE CONTROL | PER-FORMED | – | – | – | – | – | – | – | – |
| ALTERNATING-CURRENT VOLTAGE CORRECTION PROCESSING | DISCHARGE CURRENT CONTROL CORRECTION VALUE C1 TABLE | – | – | – | – | – | – | – | – | – |
| | CONSTANT VOLTAGE CONTROL CORRECTION VALUE C2 TABLE | – | PER-FORMED | PER-FORMED | PER-FORMED | PER-FORMED | PER-FORMED | PER-FORMED | PER-FORMED | – |
| DOWNTIME | | NONE | NONE | NONE | NONE | NONE | NONE | NONE | NONE | OCCUR-RED |
| CHARGING SETTING | ALTERNATING-CURRENT VOLTAGE(PEAK-TO-PEAK VOLTAGE)[V] | 1980 | 1900 | 1980 | 1900 | 1980 | 1900 | 1980 | 1900 | 1674 |
| | DISCHARGE CURRENT AMOUNT[μA] | 80 | 80 | 80 | 80 | 80 | 80 | 80 | 80 | 60 |

FIG 10

| PRINT JOB | | JOB1 | JOB2 | JOB3 | JOB4 | JOB5 | JOB6 | JOB7 | JOB8 | JOB9 |
|---|---|---|---|---|---|---|---|---|---|---|
| AMBIENT TEMPERATURE | | 14°C | 16°C | 14°C | 16°C | 14°C | 16°C | 14°C | 16°C | 17°C |
| ALTERNATING-CURRENT VOLTAGE DETERMINATION PROCESSING | DISCHARGE CURRENT CONTROL | – | PER-FORMED | – | PER-FORMED | – | PER-FORMED | – | PER-FORMED | – |
| | CONSTANT VOLTAGE CONTROL | PER-FORMED | – | PER-FORMED | – | PER-FORMED | – | PER-FORMED | – | – |
| ALTERNATING-CURRENT VOLTAGE CORRECTION PROCESSING | DISCHARGE CURRENT CONTROL CORRECTION VALUE C1 TABLE | – | – | – | – | – | – | – | – | PER-FORMED |
| | CONSTANT VOLTAGE CONTROL CORRECTION VALUE C2 TABLE | – | – | – | – | – | – | – | – | – |
| DOWNTIME | | NONE | OCCUR-RED | NONE | OCCUR-RED | NONE | OCCUR-RED | NONE | OCCUR-RED | NONE |
| CHARGING SETTING | ALTERNATING-CURRENT VOLTAGE(PEAK-TO-PEAK VOLTAGE)[V] | 1980 | 1710 | 1980 | 1710 | 1980 | 1710 | 1980 | 1710 | 1674 |
| | DISCHARGE CURRENT AMOUNT[μA] | 80 | 60 | 80 | 60 | 80 | 60 | 80 | 60 | 60 |

IMAGE FORMING APPARATUS THAT CHARGES AN IMAGE BEARING MEMBER USING A VOLTAGE SET ACCORDING TO AN ENVIRONMENTAL TEMPERATURE

BACKGROUND OF THE INVENTION

Field of the Invention

The present invention relates to an image forming apparatus including a charging device that charges an image bearing member.

Description of the Related Art

Hitherto, in an image forming apparatus that prints an image by an electrophotographic system, a surface of a photosensitive drum that is a drum-type electrophotographic photosensitive member is uniformly charged to a predetermined potential by a charging unit. Hitherto, as a charging method of such a charging unit, corona charging, which is non-contact charging in which corona generated by applying a high voltage to a thin corona discharge wire acts on the surface of the photosensitive drum to charge the photosensitive drum, has been commonly used.

On the other hand, as the charging method of the charging unit in recent years, a contact charging method which is advantageous in terms of a low voltage process, a low ozone generation amount, a low cost, and the like is becoming mainstream. The contact charging method is, for example, a method in which a charging member such as a charging roller is brought into contact with the surface of the photosensitive drum, and a voltage is applied to the charging member to charge the photosensitive drum.

Only a direct-current voltage is applied to the charging member of the contact charging type, or an alternating-current voltage is applied while being superimposed on the direct-current voltage. In a case where the alternating-current voltage is applied while being superimposed on the direct-current voltage, discharge to a positive side and discharge to a negative side alternately occur, enabling more uniform charging of the photosensitive drum. For example, it is known that an object to be charged can be uniformly charged by applying, to the charging member, a vibration voltage in which the alternating-current voltage and the direct-current voltage are superimposed, the alternating-current voltage having a peak-to-peak voltage that is twice or more a discharge start threshold voltage to the photosensitive drum when the direct-current voltage is applied.

As a method of setting the voltage to be applied to the charging member, constant voltage control of applying a constant voltage according to an environment is known. In a case where a voltage is applied to the charging member, a resistive load current flowing through a resistive load between the charging member and the photosensitive drum, a capacitive load current flowing through a capacitive load between the charging member and the photosensitive drum, and a discharge current flowing between the charging member and the photosensitive drum are generated. Then, a current obtained by summing these currents flows through the charging member.

At this time, it is empirically known that the amount of discharge current (hereinafter, referred to as a “discharge current amount”) is set to a predetermined value or more in order to obtain stable charging performance, but it is also known that a wear amount of the photosensitive drum increases when the discharge current amount is increased.

Therefore, it is necessary to set an appropriate discharge current amount in order to achieve both stable charging performance and suppression of wear of the photosensitive drum. In view of such a situation, there has been proposed an image forming apparatus that performs discharge current control of controlling the discharge current amount (for example, Japanese Patent Application Laid-Open No. 2001-201921).

In addition, in a case where the charging member is used in a low temperature and low humidity environment, a resistance or the like of the charging member increases, and thus, it is necessary to apply a voltage equal to or higher than a voltage necessary for image formation in order to acquire the discharge current amount necessary for calculation. As a result, there is a problem that power is wasted.

On the other hand, Japanese Patent Application Laid-Open No. 2018-84756 discloses an image forming apparatus that sets an appropriate voltage by correcting a reference voltage obtained by performing discharge current control according to an ambient temperature. US 2011/0158664 A discloses an image forming apparatus that determines a voltage suitable for an environmental condition by switching between constant voltage control and discharge current control according to a predetermined environment.

However, in US 2011/0158664 A, in a case where an environmental condition for performing the constant voltage control is shifted to an environmental condition for performing the discharge current control, it is necessary to perform processing of setting an appropriate voltage in the discharge current control. In particular, in US 2011/0158664 A, in a case where an environment frequently fluctuates around an environmental condition for switching between the constant voltage control and the discharge current control, processing of setting an appropriate voltage is performed every time the environmental condition for performing the constant voltage control is shifted to the environmental condition for performing the discharge current control. As a result, US 2011/0158664 A has a problem that downtime, which is a time for an operation other than an image forming operation, becomes long.

SUMMARY OF THE INVENTION

It is desirable to achieve both appropriately setting a voltage to be applied to a charging member according to an environmental temperature and suppressing an increase in downtime.

An image forming apparatus according to the present invention includes: an image bearing member; a charging member configured to come into contact with the image bearing member and charge the image bearing member when a voltage is applied; a voltage application portion configured to apply, to the charging member, a voltage in which a direct-current voltage and an alternating-current voltage are superimposed; a current detector configured to detect a current flowing through the charging member when the voltage application portion applies the voltage to the charging member; a temperature detector configured to detect an environmental temperature; and a controller configured to control the voltage application portion, in which the controller performs, in a case where an absolute value of a difference between a previous temperature detected by the temperature detector and a current temperature detected by the temperature detector is equal to or higher than a predetermined threshold, and the current temperature detected by the temperature detector is equal to or higher than a predetermined temperature, first control of controlling the voltage application portion to apply, to the charging member, a voltage at which the current detected by the current detector has a predetermined current value, the controller performs, in a case where the absolute value of the difference is equal to or higher than the predetermined threshold, and the current temperature detected by the temperature detector is lower than the predetermined temperature, second control of controlling the voltage application portion to apply, to the charging member, a predetermined voltage, the controller performs, in a case where the absolute value of the difference is lower than the predetermined threshold, and the first control is previously performed, third control of controlling the voltage application portion to apply, to the charging member, a voltage obtained by offsetting a first correction value with respect to a value of the voltage previously applied to the charging member, the controller performs, in a case where the absolute value of the difference is lower than the predetermined threshold, and the second control is previously performed, fourth control of controlling the voltage application portion to apply, to the charging member, a voltage obtained by offsetting a second correction value with respect to a value of the voltage previously applied to the charging member, and the second correction value when the previous temperature detected by the temperature detector is a first temperature and the current temperature detected by the temperature detector is a second temperature different from the first temperature is different from the first correction value when the previous temperature detected by the temperature detector is the first temperature and the current temperature detected by the temperature detector is the second temperature.

Further features of the present invention will become apparent from the following description of exemplary embodiments with reference to the attached drawings.

BRIEF DESCRIPTION OF THE DRAWINGS

FIG. 4 is a diagram illustrating an example of a table used in constant voltage control performed by the charging device according to the embodiment of the present invention;

FIG. 7 is a diagram illustrating an example of a table used in the alternating-current voltage correction processing performed by the charging device according to the embodiment of the present invention;

FIG. 8 is a diagram illustrating an example of another table used in the alternating-current voltage correction processing performed by the charging device according to the embodiment of the present invention;

FIG. 9 is a diagram for describing an effect of the charging device according to the embodiment of the present invention; and FIG. 10 is a diagram for describing an operation of the charging device when the alternating-current voltage correction processing is not performed for comparison with the effect of the charging device according to the embodiment of the present invention.

DESCRIPTION OF THE EMBODIMENTS

Figure 1:
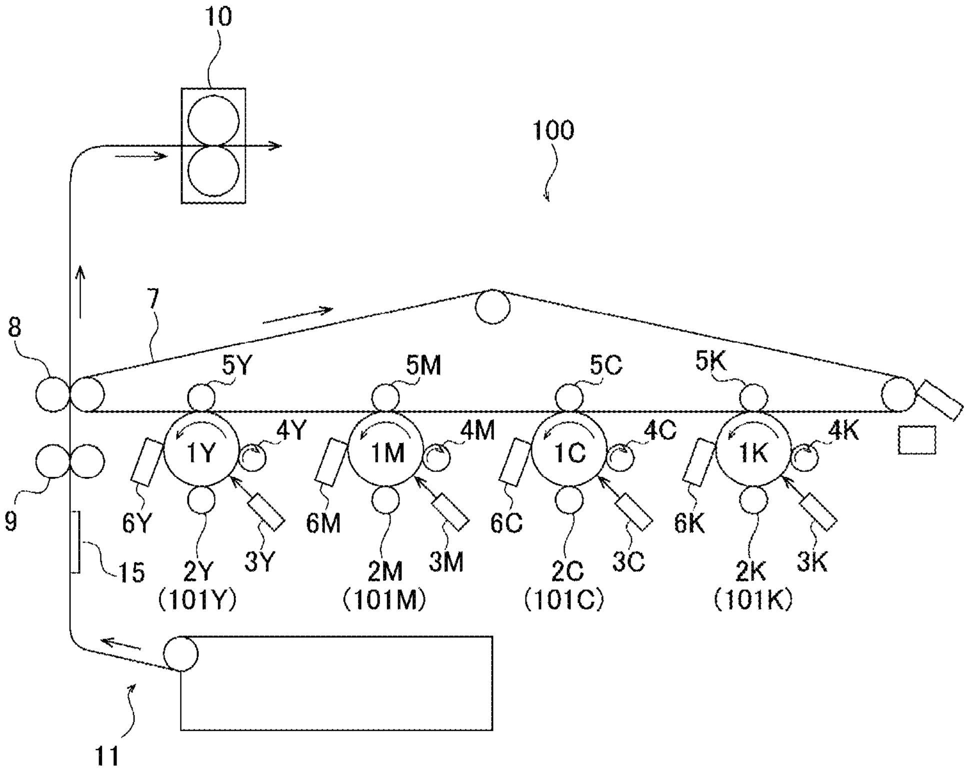
FIG. 1 is a schematic view of an image forming apparatus according to an embodiment of the present invention.

Hereinafter, embodiments will be described in detail with reference to the drawings.

Configuration of Image Forming Apparatus

A configuration of an image forming apparatus 100 according to an embodiment of the present invention will be described in detail with reference to FIGS. 1 and 2.

Here, the image forming apparatus 100 is exemplified by an electrophotographic laser beam printer adopting a contact charging method.

The image forming apparatus 100 includes photosensitive drums 1Y, 1M, 1C, and 1K, latent image devices 3Y, 3M, 3C, and 3K, developing members 4Y, 4M, 4C, and 4K, primary transfer members 5Y, 5M, 5C, and 5K, and cleaning devices 6Y, 6M, 6C, and 6K. The image forming apparatus 100 includes an intermediate transfer member 7, a secondary transfer portion 8, a registration roller pair 9, a fixing device 10, a feeding device 11, and charging devices 101Y, 101M, 101C, and 101K. Further, the image forming apparatus 100 includes a photosensitive drum driving motor M1, a charging power supply PS1, and a developing power supply PS2.

Each of Y, M, C, and K added to the end of the reference numeral of each member or device indicates a member or device used for image formation of each color of Y (yellow), M (magenta), C (cyan), and K (black). In addition, since the configuration of each member is the same, Y, M, C, and K attached to the end of each reference numeral will be omitted in the following description.

The photosensitive drum 1 serving as an image bearing member is a rotary drum type organic electrophotographic photosensitive drum having a negative charging characteristic. The photosensitive drum 1 has a configuration in which a charge generation layer made of an organic material, a charge transport layer (with a thickness of about 20 μm), and a cured layer that is a surface layer and uses a curable resin as a binder resin are sequentially applied in an overlapping manner on a surface of an aluminum cylinder (conductive drum base). A thickness of the cured layer is, for example, 8 μm.

The surface layer of the photosensitive drum 1 is not limited to the cured layer described above, and may be a charge transporting cured layer formed by curing and polymerizing a monomer having a carbon-carbon double bond and a charge transporting monomer having a carbon-carbon double bond with heat or light energy. Alternatively, the surface layer of the photosensitive drum 1 may be a charge transporting cured layer formed by curing and polymerizing a hole transporting compound having a chain-polymerizable functional group in the same molecule with energy of an electron beam. Furthermore, the surface layer of the photosensitive drum 1 does not have to include the cured layer.

Figure 2:
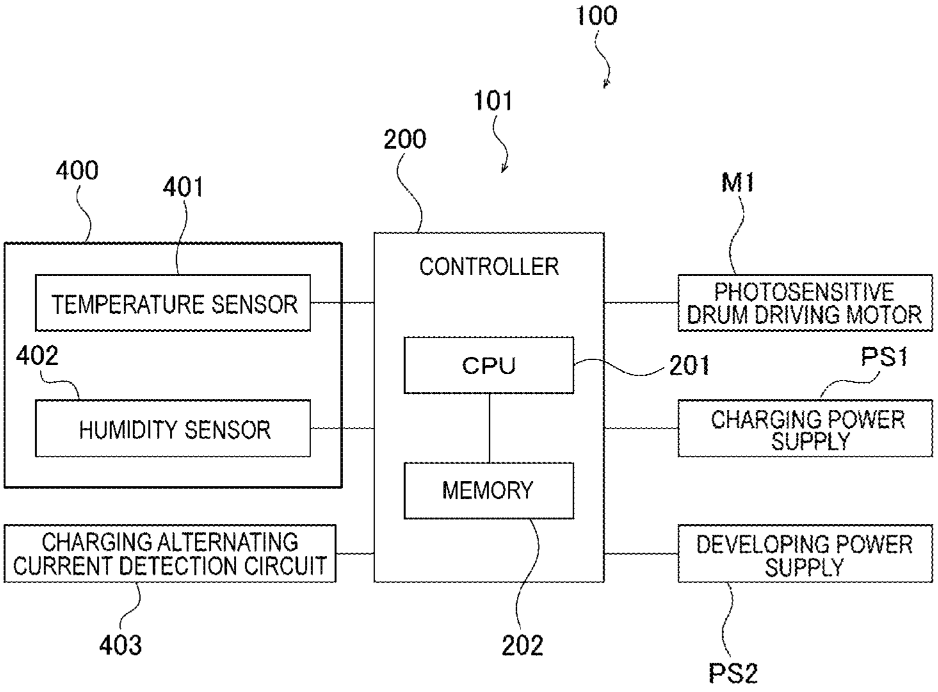
FIG. 2 is a block diagram illustrating a configuration of the image forming apparatus according to the embodiment of the present invention.

The photosensitive drum 1 has a length of 340 mm in an axial direction and an outer diameter of 30 mm, and is rotationally driven in a direction of an arrow in FIG. 1 (a counterclockwise direction in FIG. 1) at a process speed (circumferential velocity) of 200 mm/sec around a central support shaft.

The latent image device 3 serving as an exposure unit is, for example, a laser beam scanner using a semiconductor laser that forms an electrostatic latent image on the surface of the photosensitive drum 1 subjected to charging processing by the charging device 101. The latent image device 3 outputs a laser beam modulated according to an image signal transmitted from a host processing apparatus such as an image reading apparatus (not illustrated) to the image forming apparatus 100 to perform laser scanning exposure on the surface of the photosensitive drum 1. The latent image device 3 sequentially forms an electrostatic latent image corresponding to image information on the surface of the photosensitive drum 1 by decreasing a potential of a portion irradiated with the laser beam on the surface of the photosensitive drum 1 by performing the laser scanning exposure.

The developing member 4 serving as a developing unit is a developing sleeve that supplies toner to the electrostatic latent image formed on the surface of the photosensitive drum 1 by the latent image device 3 to reversely develop the electrostatic latent image as a toner image. The developing member 4 holds a magnetic brush made of a two-component developer including the toner and a carrier, and performs development while being in contact with the photosensitive drum 1. As the toner, for example, toner having an average particle diameter of about 5 μm obtained by pulverizing and classifying a mixture of a pigment and a resin binder mainly containing polyester is used. An average charging amount of the toner adhering to the photosensitive drum 1 is about −30 μC/g.

In the developing member 4, a thin developer layer is formed with rotation of the developing member 4 by a developer regulating blade (not illustrated) arranged to face the developing member 4 with a predetermined gap therebetween. The developing member 4 is rotationally driven in a direction (a clockwise direction in FIG. 1) indicated by an arrow in FIG. 1, which is opposite to a rotation direction of the photosensitive drum 1, by a developing driving motor (not illustrated).

The primary transfer member 5 is pressed against the photosensitive drum 1 with a predetermined pressing force while having the intermediate transfer member 7 interposed therebetween to form a pressing nip portion which is a primary transfer portion. A transfer voltage having a positive polarity opposite to a negative polarity, which is a normal charging polarity of the toner, is applied from a transfer power supply (not illustrated) to the primary transfer member 5. Here, the transfer voltage applied to the primary transfer member 5 from the transfer power supply is +600 V, for example. The primary transfer member 5 sequentially electrostatically transfers the toner image formed on the surface of the photosensitive drum 1 to the intermediate transfer member 7.

The cleaning device 6 removes and collects, from the photosensitive drum 1, the toner remaining on the photosensitive drum 1 without being transferred to the intermediate transfer member 7 in the primary transfer member 5.

The intermediate transfer member 7 conveys the toner image transferred from the photosensitive drum 1 by the primary transfer member 5 to the secondary transfer portion 8.

A transfer voltage having a predetermined value is applied to the secondary transfer portion 8. Here, the transfer voltage is +800 V. The secondary transfer portion 8 transfers the toner image transferred to the intermediate transfer member 7 to a recording material 15 conveyed by the registration roller pair 9. The secondary transfer portion 8 conveys the recording material 15 to which the toner image has been transferred to the fixing device 10.

The registration roller pair 9 conveys the recording material 15 fed from the feeding device 11 to the secondary transfer portion 8 at a predetermined timing.

The fixing device 10 is a heat roller fixing device that performs fixing processing of fixing the toner image transferred to the recording material 15 conveyed by the secondary transfer portion 8 onto the recording material 15 by heating and pressurizing. The fixing device 10 outputs the recording material 15 on which the toner image is fixed to the outside of the image forming apparatus 100 as an image formed product.

The feeding device 11 accommodates the recording material 15. The feeding device 11 feeds the accommodated recording material 15 to the registration roller pair 9.

The charging device 101 includes a contact charging type charging member 2 that is in contact with the photosensitive drum 1 to uniformly charge the surface of the photosensitive drum 1. Details of the configuration of the charging device 101 are described below.

The photosensitive drum driving motor M1 is driven under the control of a central processing unit (CPU) 201 of the charging device 101 described below to rotationally drive the photosensitive drum 1.

The charging power supply PS1 serving as a voltage application portion is a direct-current and alternating-current power supply, and applies a vibration voltage under a predetermined condition, in which a direct-current voltage and an alternating-current voltage are superimposed, to the charging member 2 under the control of the CPU 201. For example, the charging power supply PS1 applies, to the charging member 2, the vibration voltage having a frequency of 1.45 kHz and in which a peak-to-peak voltage of 1980 V and a direct-current voltage of −500 V are superimposed.

The developing power supply PS2 is a direct-current and alternating-current power supply, and applies a vibration voltage in which one or both of a direct-current voltage and an alternating-current voltage are superimposed to the developing member 4 under the control of the CPU 201. For example, the vibration voltage applied from the developing power supply PS2 to the developing member 4 is a vibration voltage in which a rectangular alternating-current voltage is superimposed, and here, a frequency of 8.0 kHz and a peak-to-peak voltage of 1800 V are exemplified. In addition, the direct-current voltage applied from the developing power supply PS2 to the developing member 4 is appropriately set so as to achieve an appropriate fog removal potential with respect to a potential of a developing portion of the photosensitive drum 1, and −400 V is exemplified here.

The image forming apparatus 100 having the above configuration performs a print job or a job such as a print operation, which is a series of operations of forming an image on a single or a plurality of recording materials 15 according to a start instruction and outputting the recording materials 15. The job generally includes an image forming step, a pre-rotation step, a sheet interval step when forming an image on a plurality of recording materials 15, and a post-rotation step.

Here, the image forming step is a step of forming an image on the recording material 15 and outputting the recording material 15 on which the image has been formed. In the image forming step, formation of the electrostatic image, formation of the toner image, primary transfer of the toner image, and secondary transfer of the toner image are performed. An image forming period is a period in which the image forming step is performed, which is a period during image formation. The formation of the electrostatic image, the formation of the toner image, the primary transfer of the toner image, and the secondary transfer of the toner image in the image forming step are performed at different timings.

The pre-rotation step is a step performed in a period of performing a preparation operation before the image forming step from the input of the start instruction to the actual start of image formation. The sheet interval step is a step performed in a period corresponding to an interval between the recording materials 15 when the image forming step is continuously performed on the plurality of recording materials 15 (when continuous image formation is performed). The post-rotation step is a step performed in a period in which a rearrangement operation (preparation operation) after the image forming step is performed.

A non-image forming period (at the time of non-image formation) is a period other than the image forming period. Specifically, the non-image forming period includes the pre-rotation step, the sheet interval step, the post-rotation step, a pre-multi-rotation step which is a preparation operation at the time of power supply and after returning from a sleep state, and the like.

Configuration of Charging Device

A configuration of the charging device 101 according to the embodiment of the present invention will be described in detail with reference to FIGS. 1 and 2.

The charging device 101 includes the charging member 2, a controller 200, an environmental sensor 400, and a charging alternating current detection circuit 403.

The charging member 2 has a length of 330 mm in the axial direction and a diameter of 14 mm. The charging member 2 is formed by overlapping a conductive rubber layer on an outer circumference of a stainless steel core metal. Both end portions of the core metal of the charging member 2 in a longitudinal direction are rotatably held by bearing members (not illustrated), and the charging member 2 is pressed against the photosensitive drum 1 with a predetermined pressing force by being urged toward the photosensitive drum 1 by a pressing spring (not illustrated). The charging member 2 rotates following the rotation of the photosensitive drum 1. The charging member 2 charges the photosensitive drum 1 by using a discharge phenomenon occurring in a minute gap with respect to the photosensitive drum 1.

A voltage under a predetermined condition is applied from the charging power supply PS1 to the core metal of the charging member 2. For example, when the vibration voltage in which the direct-current voltage of −500 V and the alternating-current voltage of 1980 V are superimposed is applied from the charging power supply PS1, the charging member 2 performs charging processing of uniformly charging an image forming portion of the photosensitive drum 1 to about −500 V. The direct-current voltage and the alternating-current voltage applied from the charging power supply PS1 to the charging member 2 during image formation are not limited to the above values, and are appropriately set to values suitable for favorable image formation.

The controller 200 controls the entire operation of the image forming apparatus 100. The controller 200 controls the charging power supply PS1. The controller 200 includes the CPU 201 and a memory 202.

The CPU 201 reads and executes a program stored in the memory 202, thereby controlling the operation of the image forming apparatus 100 based on data stored in the memory 202. Specifically, the CPU 201 performs switching between ON and OFF of various motors such as the photosensitive drum driving motor M1, switching between ON and OFF of the charging power supply PS1 and the developing power supply PS2, and control of an output value or the like or control of an image forming operation.

The CPU 201 stores temperature information of a temperature (ambient temperature) indicated by an electric signal input from a temperature sensor 401 in the memory 202, and stores humidity information of a humidity indicated by an electric signal input from a humidity sensor 402 in the memory 202. The CPU 201 stores, in the memory 202, total current amount information of the total current amount flowing through the charging member 2 indicated by an electric signal input from the charging alternating current detection circuit 403. The total current amount is a current amount obtained by combining a resistive load current flowing through a resistive load between the charging member 2 and the photosensitive drum 1, a capacitive load current flowing through a capacitive load between the charging member 2 and the photosensitive drum 1, and a discharge current flowing between the charging member 2 and the photosensitive drum 1.

The CPU 201 performs ON/OFF control of a direct-current power supply and an alternating-current power supply of the charging power supply PS1 to apply, to the charging member 2, the alternating-current voltage or the vibration voltage (superimposed voltage) in which the direct-current voltage and the alternating-current voltage are superimposed. The CPU 201 controls the value of the direct-current voltage applied from the charging power supply PS1 to the charging member 2 and the alternating-current current applied from the charging power supply PS1 to the charging member 2 or the alternating-current voltage. Here, as the alternating-current voltage, a peak-to-peak voltage is used. The alternating-current voltage is not limited to the peak-to-peak voltage, and a maximum voltage, a minimum voltage, or a voltage effective value may be used.

The CPU 201 performs alternating-current voltage determination processing described below for determining the voltage to be applied to the charging member 2 based on the temperature indicated by the electric signal input from the temperature sensor 401 and the temperature information stored in the memory 202.

The memory 202 stores data such as a program or a table, the temperature information, the humidity information, or the total current amount information.

The environmental sensor 400 serving as an environment information detection unit acquires environment information regarding an installation environment of the image forming apparatus 100 and outputs the environment information to the CPU 201. The environmental sensor 400 includes the temperature sensor 401 and the humidity sensor 402.

The temperature sensor 401 serving as a temperature detector is a thermistor that detects a temperature in the air (environmental temperature) as a value indicated by the environmental information. The temperature sensor 401 outputs an electric signal corresponding to the detected temperature to the CPU 201.

The humidity sensor 402 detects a humidity in the air as a value indicated by the environmental information from a change in capacitance. The humidity sensor 402 outputs an electric signal corresponding to the detected humidity to the CPU 201.

The charging alternating current detection circuit 403 serving as a current detector detects the total current amount flowing through the charging member 2 via the photosensitive drum 1 when the charging power supply PS1 applies a voltage to the charging member 2, and outputs an electric signal corresponding to the detected total current amount to the CPU 201.

Alternating-Current Voltage Determination Processing

The alternating-current voltage determination processing performed by the charging device 101 according to the embodiment of the present invention will be described in detail with reference to FIGS. 3 and 4.

Figure 3:
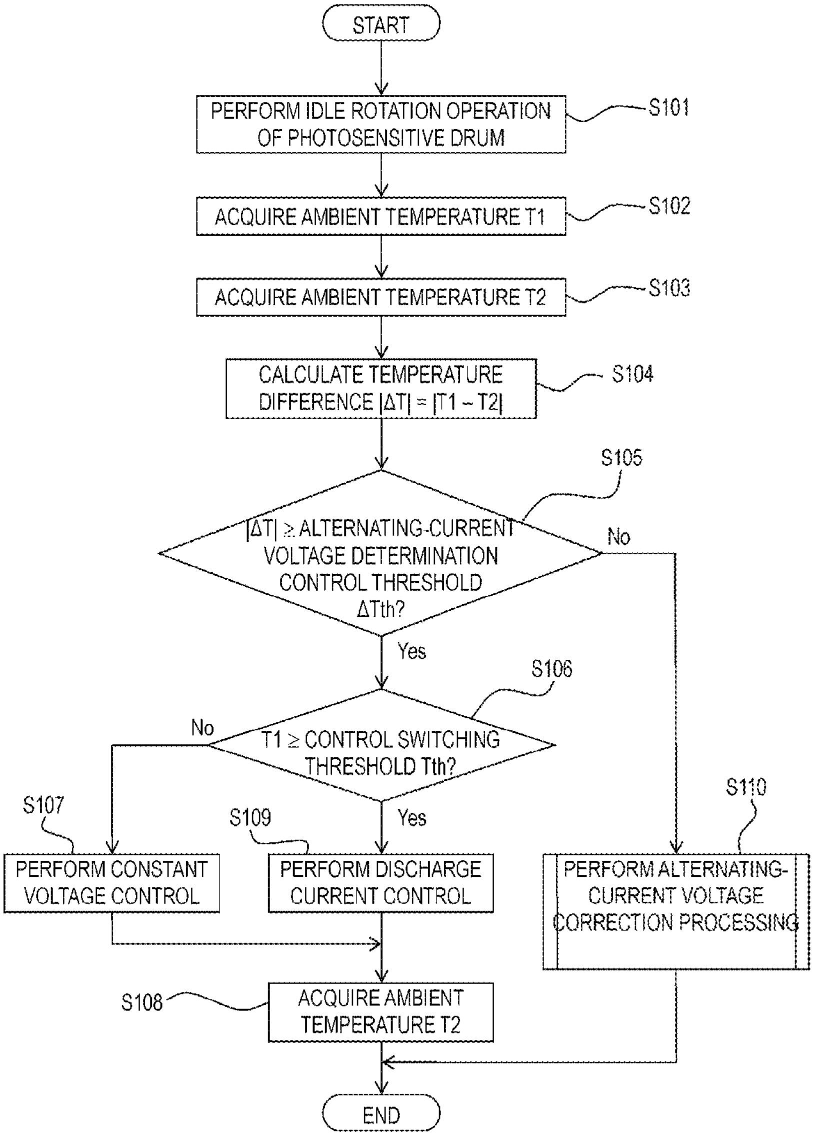
FIG. 3 is a flowchart illustrating alternating-current voltage determination processing performed by a charging device according to the embodiment of the present invention.

The alternating-current voltage determination processing illustrated in FIG. 3 is started at a timing when the preparation operation from when the start instruction for image formation is input to the image forming apparatus 100 to when the image forming apparatus 100 actually starts image formation starts, a timing when the image forming apparatus 100 is powered on, or a timing when the image forming apparatus 100 returns from the sleep state. For example, the alternating-current voltage determination processing illustrated in FIG. 3 is started at a timing when the image forming apparatus 100 starts the pre-multi-rotation step or a timing when the image forming apparatus 100 starts the pre-rotation step.

First, the CPU 201 performs an idle rotation operation of the photosensitive drum 1 by controlling driving of the photosensitive drum driving motor M1 (S101).

Next, the CPU 201 acquires an ambient temperature T1 based on the electric signal input from the temperature sensor 401 of the environmental sensor 400, and stores the ambient temperature T1 in the memory 202 (S102).

Next, the CPU 201 reads and acquires an ambient temperature T2 during the previous constant voltage control or discharge current control, stored in the memory 202 (S103).

Next, the CPU 201 calculates an absolute value |ΔT| of a difference ΔT between the current ambient temperature T1 and the previous ambient temperature T2 (S104).

Next, the CPU 201 determines whether or not the absolute value |ΔT| is equal to or larger than an alternating-current voltage determination control threshold ΔTth (S105). Here, 3° C. is exemplified as the alternating-current voltage determination control threshold ΔTth.

Here, the alternating-current voltage determination control threshold ΔTth is set based on a daily temperature fluctuation in the installation environment of the image forming apparatus 100, detection accuracy of the environmental sensor 400, or productivity, and specifically, is set based on a temperature, a humidity, a moisture amount, a time, the number of passing sheets, or the like. For example, the alternating-current voltage determination control threshold ΔTth is set based on the average daily temperature fluctuation in the installation environment of the image forming apparatus 100, and is set such that downtime due to the daily temperature fluctuation is significantly reduced.

In a case where the absolute value |ΔT| is equal to or larger than the alternating-current voltage determination control threshold ΔTth (step S105: Yes), the CPU 201 starts to perform control for setting the voltage and determines whether or not the ambient temperature T1 is equal to or higher than a control switching threshold Tth (S106). Here, 15° C. is exemplified as the control switching threshold Tth.

In a case where the ambient temperature T1 is equal to or higher than the control switching threshold Tth (step S106: Yes), the CPU 201 performs discharge current control as first control (S109). Here, the discharge current control is control for setting the voltage to be applied to the charging member 2, and is control for obtaining the alternating-current voltage necessary for outputting an appropriate discharge current amount. The CPU 201 performs the discharge current control to control the charging power supply PS1 so as to apply, to the charging member 2, a voltage at which a current detected by the charging alternating current detection circuit 403 has a predetermined current value. Details of the discharge current control are described below.

Next, the CPU 201 stores the ambient temperature T1 acquired in the processing of step S102 in the memory 202 as the ambient temperature T2 (S108), and then ends the alternating-current voltage determination processing.

On the other hand, in a case where the ambient temperature T1 is lower than the control switching threshold Tth (step S106: No), the CPU 201 performs constant voltage control as second control (S107), and then performs the processing of step S108. Here, the constant voltage control is control for setting the voltage to be applied to the charging member 2, and is control for stabilizing the voltage to a desired predetermined voltage value. The CPU 201 performs the constant voltage control to control the charging power supply PS1 so as to apply a predetermined voltage to the charging member 2.

Specifically, the CPU 201 obtains an alternating-current voltage Vx associated with the ambient temperature T1 acquired in the processing of step S2 in a table in which the ambient temperature T1 and the alternating-current voltage Vx as an alternating-current component stored in the memory 202 are associated with each other illustrated in FIG. 4 as an example. Then, the CPU 201 monitors an output voltage of the charging power supply PS1 via a resistor (not illustrated), feeds back the monitored output voltage to a voltage setting circuit unit (not illustrated), and performs control such that the obtained alternating-current voltage Vx is applied from the charging power supply PS1 to the charging member 2.

In a case where the absolute value |ΔT| is less than the alternating-current voltage determination control threshold ΔTth (step S105: No), the CPU 201 performs the alternating-current voltage correction processing without starting to perform the control for setting the voltage to be applied to the charging member 2 (S110). Thereafter, the CPU 201 ends the alternating-current voltage determination processing. The alternating-current voltage correction processing is described below.

Then, the CPU 201 performs image formation in the image forming step while controlling the charging power supply PS1 so as to apply the alternating-current voltage Vx set by the alternating-current voltage determination processing to the charging member 2.

The alternating-current voltage determination processing is started at the timing when the pre-multi-rotation step is started or the timing when the pre-rotation step is started. However, the alternating-current voltage determination processing is not limited thereto, and may be started at the timing when the image forming apparatus 100 is powered on (ON), the timing when the image forming apparatus 100 returns from the sleep state, or the timing when printing is instructed.

In the alternating-current voltage determination processing described above, the alternating-current power of the voltage applied in the constant voltage control in a case where the current temperature detected by the temperature sensor 401 is a third temperature lower than the control switching threshold Tth is larger than the alternating-current power of the voltage applied in the constant voltage control in a case where the current temperature detected by the temperature sensor 401 is a fourth temperature lower than the control switching threshold Tth and higher than the third temperature as illustrated in FIG. 4.

Discharge Current Control

Figure 5:
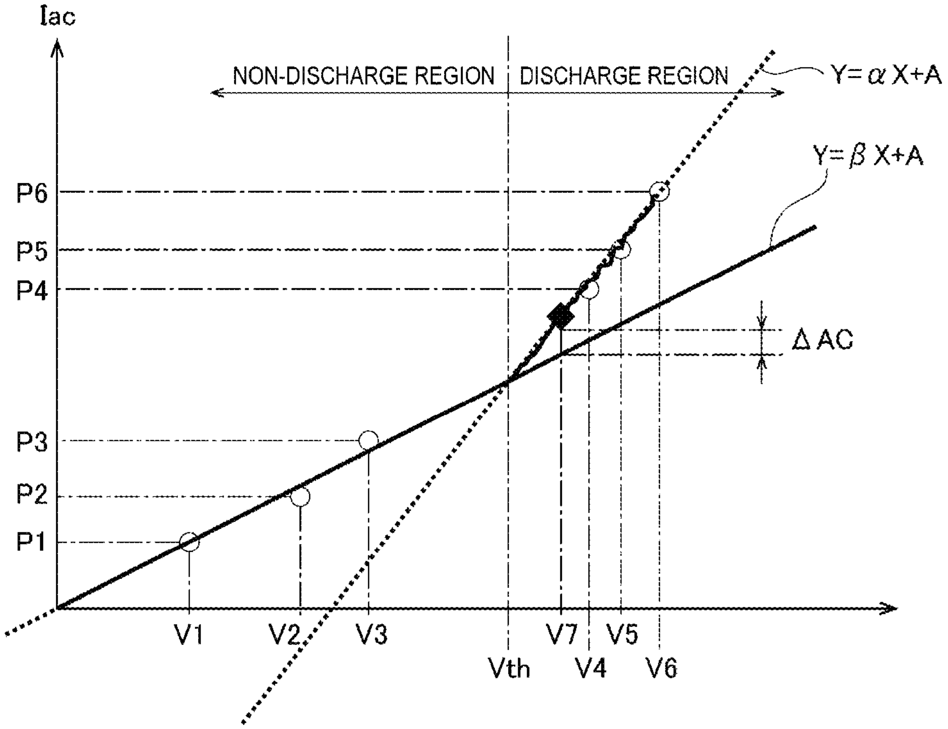
FIG. 5 is a diagram illustrating a relationship between an alternating-current voltage and a total current amount in discharge current control performed by the charging device according to the embodiment of the present invention.

The discharge current control performed by the charging device 101 according to the embodiment of the present invention will be described in detail with reference to FIG. 5.

The CPU 201 controls the charging power supply PS1 so as to sequentially apply voltages of three points of voltage values V1, V2, and V3 of an alternating-current voltage Vpp in a non-discharge region to the charging member 2, and subsequently sequentially apply voltages of three points of voltage values V4, V5, and V6 of the alternating-current voltage Vpp in a discharge region.

A relationship between the voltage values V1, V2, and V3 of the non-discharge region and current values P1, P2, and P3 of a total current amount Iac flowing when the voltages of the voltage values V1, V2, and V3 are applied is obtained as an approximate straight line of Equation (1) by a least squares method.

$$Y=\beta X+B \tag{1}$$

In addition, a relationship between the voltage values V4, V5, and V6 of the discharge region and current values P4, P5, and P6 of the total current amount Iac flowing when the voltages of the voltage values V4, V5, and V6 are applied is obtained as an approximate straight line of Equation (2) by a least squares method.

$$Y=\alpha X+A \tag{2}$$

A discharge current amount ΔAC can be obtained by subtracting a current amount of currents other than the discharge current, such as the resistive load current and the capacitive load current, from the total current amount Iac, and can be obtained by a difference between Equations (2) and (1). Therefore, the value Vx of the alternating-current voltage Vpp at which the discharge current amount becomes the target discharge current amount ΔAC can be obtained based on the difference between the approximate straight line of the discharge region of Equation (2) and the approximate straight line of the non-discharge region of Equation (1).

Specifically, the target discharge current amount ΔAC is expressed by Expression (5) based on a difference between Expression (4) in which the Y value and the X value in Expression (2) are replaced with Yα and Vx, respectively, and Expression (3) in which the Y value and the X value in Expression (1) are replaced with Yβ and Vx, respectively.

$$Y\beta=\beta Vx+B \tag{3}$$

$$Y\alpha=\alpha Vx+A \tag{4}$$

-continued $$Y\alpha-Y\beta=(\alpha Vx+A)-(\beta Vx+B)=\Delta AC \tag{5}$$

Then, a voltage value V7 of the voltage Vx can be obtained from Equation (6) obtained by modifying Equation (5).

$$Vx=(D-A+B)/(\alpha-\beta) \tag{6}$$

The CPU 201 controls the charging power supply PS1 to apply the voltage Vx of the voltage value V7 obtained by Equation (6) to the charging member 2. Here, 60 μA is exemplified as the target discharge current amount ΔAC.

Alternating-Current Voltage Correction Processing

The alternating-current voltage correction processing performed by the charging device 101 according to the embodiment of the present invention will be described in detail with reference to FIG. 6.

Figure 6:
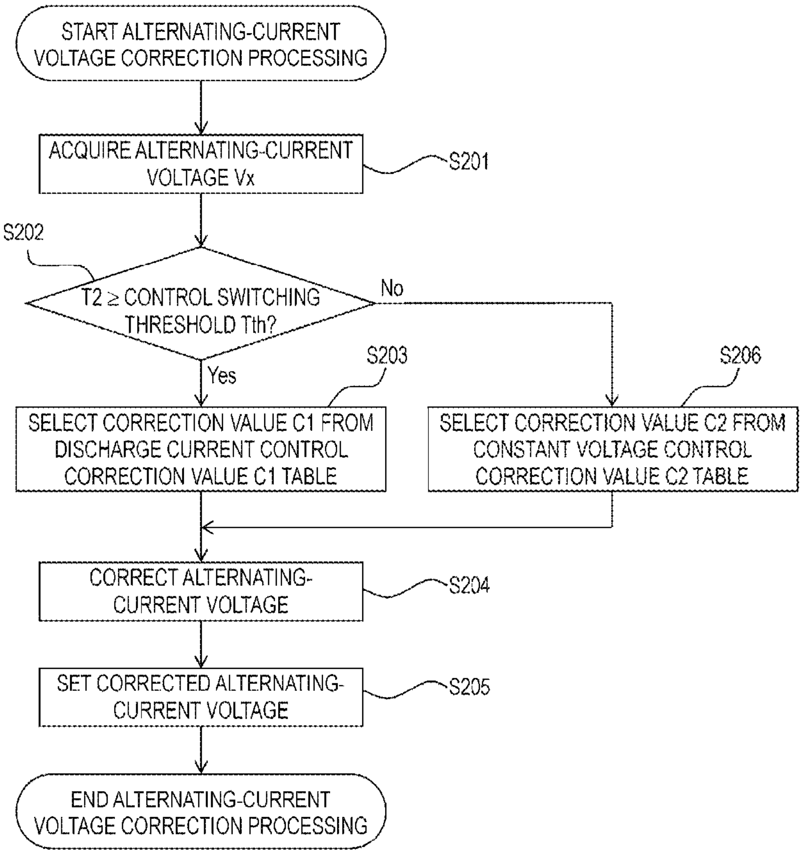
FIG. 6 is a flowchart illustrating alternating-current voltage correction processing performed by the charging device according to the embodiment of the present invention.

The alternating-current voltage correction processing illustrated in FIG. 6 is started at a timing when it is determined in the processing of step S105 of the alternating-current voltage determination processing illustrated in FIG. 3 that the absolute value |ΔT| is less than the alternating-current voltage determination control threshold ΔTth (step S105: No).

First, the CPU 201 reads and acquires the alternating-current voltage Vx determined in the immediately previous discharge current control or constant voltage control stored in the memory 202 (S201).

Next, the CPU 201 determines whether or not the ambient temperature T2 during the previous constant voltage control or discharge current control, stored in the memory 202 is equal to or higher than the control switching threshold Tth (S202). Here, 15° C. is exemplified as the control switching threshold Tth. Here, in the processing of step S202, the CPU 201 determines whether or not the discharge current control has been previously performed.

In a case where the ambient temperature T2 is equal to or higher than the control switching threshold Tth (step S202: Yes), since the discharge current control has been previously performed, the CPU 201 selects a correction value C1 as a first correction value (S203). Specifically, the CPU 201 selects the correction value C1 associated with the ambient temperature T1 in a discharge current control correction value C1 table illustrated as an example in FIG. 7 stored in the memory 202. Here, the discharge current control correction value C1 table is a table in which the ambient temperature T1, a change amount ΔT from the ambient temperature T2 to the ambient temperature T1, and the correction value C1 are associated with each other, and is a table for correcting the alternating-current voltage Vx determined in the discharge current control.

Next, the CPU 201 corrects the alternating-current voltage Vx based on the alternating-current voltage Vx acquired in the processing of step S201 and the correction value C1 selected in the processing of step S203 (S204).

Specifically, the CPU 201 corrects the alternating-current voltage Vx by adding the correction value C1 to the alternating-current voltage Vx. For example, the CPU 201 selects the correction value C1 of 72 V from FIG. 7 in a case where the print job is performed when the alternating-current voltage Vx determined in the discharge current control performed when the ambient temperature T2 is 20° C. is 1580 V and then the ambient temperature T1 is changed to 18° C. Then, the CPU 201 adds the correction value C1 of 72 V to the alternating-current voltage Vx of 1580 V to obtain 1652 V as the corrected alternating-current voltage Vx.

The correction of the alternating-current voltage Vx is not limited to addition of the correction value C1 to the alternating-current voltage Vx, and the alternating-current voltage Vx may be multiplied by the correction value C1, and correction can be performed by any method.

Next, the CPU 201 sets the corrected alternating-current voltage Vx as the alternating-current voltage to be applied from the charging power supply PS1 to the charging member 2 (S205), and then ends the alternating-current voltage correction processing.

Then, the CPU 201 ends the alternating-current voltage determination processing illustrated in FIG. 3 after ending the alternating-current voltage correction processing.

On the other hand, in a case where the ambient temperature T2 is lower than the control switching threshold Tth (step S202: No), since the constant voltage control has been previously performed, the CPU 201 selects a correction value C2 as a second correction value (S204). Specifically, the CPU 201 selects the correction value C2 associated with the ambient temperature T1 in a constant voltage control correction value C2 table illustrated as an example in FIG. 8 stored in the memory 202. Here, the constant voltage control correction value C2 table is a table in which the ambient temperature T1, the change amount ΔT from the ambient temperature T2 to the ambient temperature T1, and the correction value C2 are associated with each other, and is a table for correcting the alternating-current voltage Vx determined in the constant voltage control.

In the processing of step S204 described above, in a case where the correction value C1 is selected, the CPU 201 performs third control of controlling the charging power supply PS1 so as to apply, to the charging member 2, a voltage obtained by offsetting the correction value C1 with respect to the value of the voltage previously applied to the charging member 2. Further, in a case where the correction value C2 is selected, the CPU 201 performs fourth control of controlling the charging power supply PS1 so as to apply, to the charging member 2, a voltage obtained by offsetting the correction value C2 with respect to the value of the voltage previously applied to the charging member 2.

In the alternating-current voltage correction processing described above, the correction value C2 in a case where the previous temperature detected by the temperature sensor 401 is a first temperature and the current temperature detected by the temperature sensor 401 is a second temperature different from the first temperature is different from the correction value C1 in a case where the previous temperature detected by the temperature sensor 401 is the first temperature and the current temperature detected by the temperature sensor 401 is the second temperature.

In the alternating-current voltage correction processing, an absolute value of the correction value C2 when the previous temperature detected by the temperature sensor 401 is the first temperature and the current temperature detected by the temperature sensor 401 is the second temperature different from the first temperature is larger than an absolute value of the correction value C1 when the previous temperature detected by the temperature sensor 401 is the first temperature and the current temperature detected by the temperature sensor 401 is the second temperature as illustrated in FIGS. 7 and 8.

The reason why the discharge current control correction value C1 table and the constant voltage control correction value C2 table are distinguished in the alternating-current voltage correction processing will be described.

The alternating-current voltage Vx set in the discharge current control is set in consideration of variation in high voltage output. Therefore, it is not necessary to consider the variation in high voltage output for a correction amount of the alternating-current voltage Vx set in the discharge current control. On the other hand, the alternating-current voltage Vx set in the constant voltage control is set on the assumption that the high voltage output is the lowest.

Therefore, in a case where the alternating-current voltage Vx set in the constant voltage control is corrected using the correction value C1 of the discharge current control correction value C1 table for correcting the alternating-current voltage Vx set in the discharge current control, the discharge current amount may be insufficient. Therefore, it is necessary to switch between the discharge current control correction value C1 table and the constant voltage control correction value C2 table in which the correction amount is larger than that in the discharge current control correction value C1 table.

Effects of Charging Device

The effects of the charging device 101 according to the embodiment of the present invention will be described in detail with reference to FIGS. 9 and 10.

FIGS. 9 and 10 illustrate a case where the print job is performed nine times in total in a state in which the ambient temperature fluctuates around the control switching threshold Tth. FIG. 9 illustrates a state in which the alternating-current voltage determination processing is performed, a state in which the alternating-current voltage correction processing is performed, and the set alternating-current voltage and discharge current amount in the present embodiment. FIG. 10 illustrates a state in which the alternating-current voltage determination control is performed, and the set alternating-current voltage and discharge current amount in a case where the alternating-current voltage correction processing is not performed for comparison with the present embodiment. FIGS. 9 and 10 illustrate a case where the control switching threshold Tth is 15° C. as an example.

In the present embodiment, as illustrated in FIG. 9, in a case where the control switching threshold Tth is frequently exceeded, the discharge current control and the constant voltage control are not performed until the absolute value |ΔT| exceeds 3° C. of the alternating-current voltage determination control threshold ΔTth. In addition, in the present embodiment, the alternating-current voltage can be set without falling below the discharge current amount of 60 μA at which a charging failure occurs. Furthermore, in the present embodiment, the discharge current control that causes the downtime is performed once, and thus, an appropriate alternating-current voltage can be set with a short downtime.

On the other hand, in FIG. 10, the discharge current control or the constant voltage control is performed every time the control switching threshold Tth is exceeded. In FIG. 10, although the alternating-current voltage with a smaller discharge current amount can be set as compared with FIG. 9, the discharge current control is performed four times, and it can be seen that the downtime increases.

As described above, according to the present embodiment, in a case where an environmental condition for performing the constant voltage control is shifted to an environmental condition for performing the discharge current control, the alternating-current voltage set in the constant voltage control is corrected according to the environmental information without performing the discharge current control.

In the present embodiment, before switching from the constant voltage control to the discharge current control, the voltage applied to the charging member 2 by the constant voltage control is corrected based on the ambient temperature and applied to the charging member 2. As a result, when the environmental condition changes, an appropriate voltage can be set, and an operation time other than a time for the image forming operation can be shortened.

It goes without saying that the present invention is not limited to the above embodiment, and various modifications can be made without departing from the gist of the present invention.

Specifically, in the above embodiment, the alternating-current voltage to be applied to the charging member 2 is set based on the ambient temperature, but the present invention is not limited thereto, and the alternating-current voltage to be applied to the charging member 2 may be set based on an ambient humidity in addition to or instead of the ambient temperature. The alternating-current voltage to be applied to the charging member 2 may be set using a value indicating an environmental condition other than the ambient temperature and the ambient humidity.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-166022, filed Sep. 27, 2023, which is hereby incorporated by reference herein in its entirety.

What is claimed is:

1. An image forming apparatus comprising:

an image bearing member;

a charging roller configured to come into contact with the image bearing member and charge the image bearing member when a voltage is applied;

a charging power supply configured to apply, to the charging roller, a voltage in which a direct-current voltage and an alternating-current voltage are superimposed;

a current detector configured to detect a current flowing through the charging roller when the charging power supply applies the voltage to the charging roller;

a temperature detector configured to detect an environmental temperature; and a controller configured to control the charging power supply, wherein the controller performs, in a case where an absolute value of a difference between a previous temperature detected by the temperature detector and a current temperature detected by the temperature detector is equal to or higher than a predetermined threshold, and the current temperature detected by the temperature detector is equal to or higher than a predetermined temperature, first control of controlling the charging power supply to apply, to the charging roller, a voltage at which the current detected by the current detector has a predetermined current value, the controller performs, in a case where the absolute value of the difference is equal to or higher than the predetermined threshold, and the current temperature detected by the temperature detector is lower than the predetermined temperature, second control of controlling the charging power supply to apply, to the charging roller, a predetermined voltage, the controller performs, in a case where the absolute value of the difference is lower than the predetermined threshold, and the first control is previously performed, third control of controlling the charging power supply to apply, to the charging roller, a voltage obtained by offsetting a first correction value with respect to a value of the voltage previously applied to the charging roller, the controller performs, in a case where the absolute value of the difference is lower than the predetermined threshold, and the second control is previously performed, fourth control of controlling the charging power supply to apply, to the charging roller, a voltage obtained by offsetting a second correction value with respect to a value of the voltage previously applied to the charging roller, and an absolute value of the second correction value when the previous temperature detected by the temperature detector is a first temperature and the current temperature detected by the temperature detector is a second temperature different from the first temperature is larger than an absolute value of the first correction value when the previous temperature detected by the temperature detector is the first temperature and the current temperature detected by the temperature detector is the second temperature.

2. The image forming apparatus according to claim 1, wherein the controller performs the third control in a case where the absolute value of the difference is lower than the predetermined threshold and the previous temperature detected by the temperature detector is equal to or higher than the predetermined temperature, and the controller performs the fourth control in a case where the absolute value of the difference is lower than the predetermined threshold and the previous temperature detected by the temperature detector is lower than the predetermined temperature.

3. The image forming apparatus according to claim 1, wherein an alternating-current component of the predetermined voltage when the current temperature detected by the temperature detector is a third temperature lower than the predetermined temperature is larger than an alternating-current component of the predetermined voltage when the current temperature detected by the temperature detector is a fourth temperature lower than the predetermined temperature and higher than the third temperature.

4. The image forming apparatus according to claim 1, wherein the controller selects and performs one of the first control, the second control, the third control, and the fourth control at a timing when a preparation operation from input of a start instruction for image formation to actual start of image formation is started.

5. The image forming apparatus according to claim 1, wherein the controller selects and performs one of the first control, the second control, the third control, and the fourth control at a timing when the image forming apparatus is powered on.

6. The image forming apparatus according to claim 1, wherein the controller selects and performs one of the first control, the second control, the third control, and the fourth control at a timing when the image forming apparatus returns from a sleep state.

* * * * *